US009253729B1

(12) United States Patent
Sundar et al.

(10) Patent No.: US 9,253,729 B1
(45) Date of Patent: Feb. 2, 2016

(54) METHOD AND APPARATUS FACILITATING POWER CONSERVATION IN WIRELESS USER EQUIPMENT

(71) Applicant: Alcatel-Lucent USA Inc., Murray Hill, NJ (US)

(72) Inventors: Sriram R. Sundar, Naperville, IL (US); Kannan T. Konda, Aurora, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/500,138

(22) Filed: Sep. 29, 2014

(51) Int. Cl.
*H04W 72/04* (2009.01)
*H04W 52/02* (2009.01)
*H04W 76/02* (2009.01)
*H04W 84/04* (2009.01)

(52) U.S. Cl.
CPC .......... *H04W 52/0261* (2013.01); *H04W 76/02* (2013.01); *H04W 84/042* (2013.01)

(58) Field of Classification Search
CPC . H04L 5/001; H04L 5/0053; H04W 56/0005; H04W 72/0406
See application file for complete search history.

(56) References Cited

U.S. PATENT DOCUMENTS

| | | | | |
|---|---|---|---|---|
| 8,995,299 B2 * | 3/2015 | Comeau | ............... | H04L 5/0098 370/252 |
| 2014/0112282 A1 * | 4/2014 | Wijting | ............... | H04W 72/04 370/329 |
| 2014/0341109 A1 * | 11/2014 | Cartmell | ............... | H04L 45/308 370/328 |

OTHER PUBLICATIONS

3GPP TS 36.331 version 9.3.0 Release 9, LTE; Evolved Universal Terrestrial Radio Access (E-UTRA); Radio Resource Control (RRC); Protocol specification; Jul. 2010; 254 pp.
3GPP TS 36.306 version 11.4.0 Release 11, LTE; Evolved Universal Terrestrial Radio Access (E-UTRA); User Equipment (UE) radio access capabilities; Sep. 2013; 29 pp.

* cited by examiner

*Primary Examiner* — Bobbak Safaipour
(74) *Attorney, Agent, or Firm* — Fay Sharpe LLP

(57) ABSTRACT

A method facilitating power conservation in a wireless user equipment includes storing carrier aggregation information in a storage device at a wireless user equipment, monitoring a power level of a battery in the wireless user equipment during operation in a wireless network, and varying a current support capability for a carrier aggregation feature and the carrier aggregation information in relation to the power level of the battery such that less secondary component carriers are supported by the wireless user equipment as the power level of the battery decreases. The wireless user equipment including the storage device and at least one processor configured to monitor the power level of the battery and to vary the current support capability for the carrier aggregation feature and the carrier aggregation information in relation to the power level of the battery. A non-transitory computer-readable medium storing program instructions associated with the method is also provided.

20 Claims, 4 Drawing Sheets

METHOD AND APPARATUS FACILITATING POWER CONSERVATION IN WIRELESS USER EQUIPMENT

BACKGROUND

This disclosure relates to techniques for conserving power in wireless user equipment to extend the life of a battery powering the user equipment. Various embodiments of method, apparatus, and non-transitory computer-readable medium are disclosed to facilitate power conservation in the wireless user equipment. The power conservation techniques find particular application in conjunction with user equipment that supports a carrier aggregation feature while the user equipment is operated in a wireless network that provides the carrier aggregation feature. Other applications of the power conservation techniques in conjunction with other wireless network features are also contemplated for the various embodiments described herein.

Smartphones are the Swiss army knives of the tech world. They function as music and video players, web browsers, personal organizers, calendar, mail reader, GPS and also a cell phone among other things. People don't want their smartphones to run out of battery life when they need it the most. Battery life is one of the most important considerations that people make when choosing a smartphone. With moderate use, one can extend the battery life to last an entire day before needing to be recharged.

Smartphones drain batteries faster in poor coverage areas searching for a good signal. Smartphones can also drain battery searching for open Wi-Fi Hot-Spots, Bluetooth, GPS, infrared capabilities. So users can take some simple precautions like turning off these features except when needed.

With the launch of carrier aggregation (CA) (e.g., a feature of long term evolution (LTE) Advanced and evolved universal terrestrial radio access networks (E-UTRA)), smartphones can gain access to a total bandwidth of up to 100 MHz and offering peak download speeds exceeding 1 Gb/s. For additional information on E-UTRAN, see, for example: i) 3GPP TS 36.331, version 9.3.0, Release 9, July 2010; and ii) 3GPP TS 36.306, version 11.4.0, Release 11, September 2013. The contents of these documents are fully incorporated herein by references. For CA, smartphones are constantly scanning for multiple eligible secondary component carriers while being connected to the primary component carrier. This may even cause the battery to drain faster when the smartphone is in good radio conditions. So, while a smartphone may be in the right radio conditions to support CA with multiple secondary carriers and give the user fast download/upload speeds, the battery life on the smartphone could be draining at a faster rate than desired. This may leave the user with a smartphone having no battery life when they need to use the device. A power management and power saving mode to optimize battery life of CA-capable smartphones is not available.

For these and other reasons, there is a need to define power management and power saving techniques for CA-capable wireless user equipment that is compatible with CA features offered by a wireless network.

SUMMARY

In one aspect, a method facilitating power conservation in a wireless user equipment is provided. In one embodiment, the method includes: storing carrier aggregation information in a storage device at a wireless user equipment, wherein the wireless user equipment is configured to operate in a wireless network formed by a plurality of base stations and a core network, wherein the wireless user equipment is configured to operate using a variable support capability for a carrier aggregation feature provided by the wireless network, wherein the carrier aggregation feature enables the wireless user equipment to aggregate bandwidth of a primary component carrier and at least one secondary component carrier to improve throughput, wherein the carrier aggregation information in the storage device is indicative of a current support capability of the wireless user equipment in relation to the carrier aggregation feature; monitoring a power level of a battery in the wireless user equipment during operation of the wireless user equipment in the wireless network, wherein the plurality of base stations include a serving base station providing wireless service to the wireless user equipment; and varying the current support capability for the carrier aggregation feature at the wireless user equipment and the carrier aggregation information in the storage device in relation to the power level of the battery such that less secondary component carriers are supported by the wireless user equipment as the power level of the battery decreases.

In another aspect, a wireless user equipment configured to operate in a wireless network formed by a plurality of base stations and a core network is provided. In one embodiment, the wireless user equipment includes: a storage device configured to store carrier aggregation information, wherein the wireless user equipment is configured to operate using a variable support capability for a carrier aggregation feature provided by the wireless network, wherein the carrier aggregation feature enables the wireless user equipment to aggregate bandwidth of a primary component carrier and at least one secondary component carrier to improve throughput, wherein carrier aggregation information stored in the storage device is indicative of a current support capability in relation to the carrier aggregation feature; and at least one processor configured to monitor a power level of a battery in the wireless user equipment during operation of the wireless user equipment in the wireless network, wherein the plurality of base stations include a serving base station providing wireless service to the wireless user equipment. The at least one processor is configured to vary the current support capability for the carrier aggregation feature and the carrier aggregation information in the storage device in relation to the power level of the battery such that less secondary component carriers are supported as the power level of the battery decreases.

In yet another aspect, a non-transitory computer-readable medium storing program instructions is provided. The program instructions, when executed by a processor, cause a wireless user equipment to perform a method facilitating power conservation. In one embodiment, the method includes: storing carrier aggregation information in a storage device at a wireless user equipment, wherein the wireless user equipment is configured to operate in a wireless network formed by a plurality of base stations and a core network, wherein the wireless user equipment is configured to operate using a variable support capability for a carrier aggregation feature provided by the wireless network, wherein the carrier aggregation feature enables the wireless user equipment to aggregate bandwidth of a primary component carrier and at least one secondary component carrier to improve throughput, wherein the carrier aggregation information in the storage device is indicative of a current support capability of the wireless user equipment in relation to the carrier aggregation feature; monitoring a power level of a battery in the wireless user equipment during operation of the wireless user equipment in the wireless network, wherein the plurality of base stations include a serving base station providing wireless service to the wireless user equipment; and varying the current support capability for the carrier aggregation feature at the wireless user equipment and the carrier aggregation information in the storage device in relation to the power level of the battery such that less secondary component carriers are supported by the wireless user equipment as the power level of the battery decreases.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

During initial launch of CA capability, devices may support multiple component carriers but the service provider may not have all the carriers configured. One possibility is for service providers to activate/deactivate the configured carriers as needed. Since each carrier uses the physical legacy layer structure for backward compatibility, the carrier is fully accessible to the device.

For example, the device may support two CA bandwidth combinations: 1) band 17 as primary carrier and band 4 as secondary carrier and 2) band 4 as primary carrier and band 17 as secondary carrier. If the network only supports CA with band 17 as primary carrier, the network can deactivate CA for the second configuration for the terminal.

A power management and power saving mode capability to automatically optimize battery life can be used when CA eligible radio conditions are satisfied. When the device is connected to power source, the device can take advantage of the complete set of available CA component carriers. When the device is not connected to a power source and the battery life is below a certain threshold, the device shall notify the eNodeB of a reduced set of supported bandwidth combinations for the device. The eNodeB will then deactivate CA for the device in the configuration it no longer supports and the device stops scanning for secondary carriers that are no longer supported. Thus, by disabling some CA capabilities, the battery life of the UE can be extended. Once the device is connected to a power source and the battery starts charging and exceeds a given threshold, the device shall notify the eNodeB of the increased set of supported bandwidth combinations it can support.

For example, radio resource control (RRC) connection messages can be exchanged between a CA-capable device and the eNodeB to adjust the capabilities implemented by the UE and E-UTRAN for the CA feature. Similarly, a capability information message exchanged with the E-UTRAN to adjust the capabilities implemented by the UE and E-UTRAN for the CA feature. RRC connection reconfiguration messages can also be exchanged with the E-UTRAN to adjust the capabilities implemented by the UE and E-UTRAN for the CA feature. Current devices may support more than six frequency bands and multiple bandwidth configurations.

Figure 1:
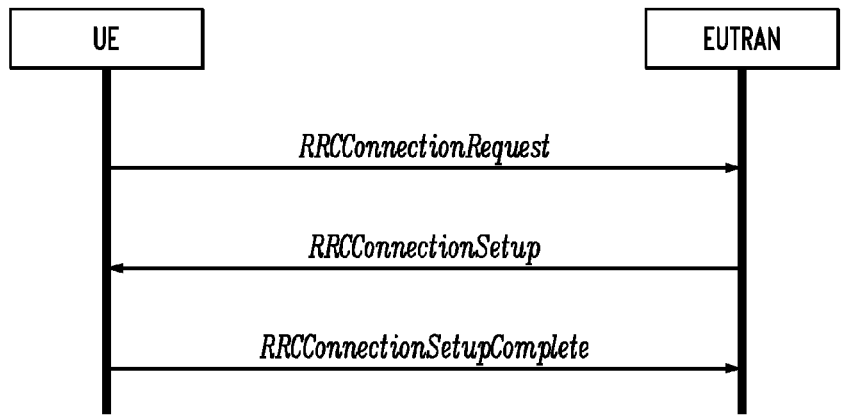
FIG. 1 is a message flow diagram representative of successful radio resource control (RRC) connection establishment between a user equipment and an evolved universal terrestrial radio access network (E-UTRAN)
Figure 2:
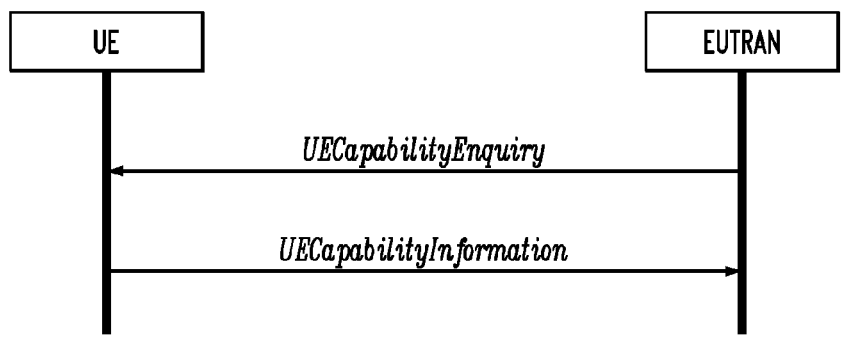
FIG. 2 is a message flow diagram representative of a capability transfer between a user equipment and an E-UTRAN.
Figure 3:
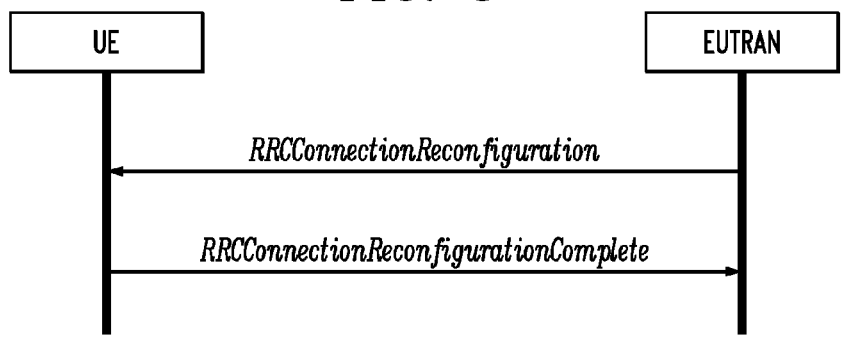
FIG. 3 is a message flow diagram representative of successful RRC connection reconfiguration between a user equipment and an E-UTRAN.

FIG. 1 provides a message flow diagram representative of successful radio resource control (RRC) connection establishment between the UE and E-UTRAN. FIG. 2 provides a message flow diagram representative of a capability transfer between the UE and E-UTRAN. FIG. 3 provides a message flow diagram representative of successful RRC connection reconfiguration between the UE and E-UTRAN.

In the UE-EUTRA-capability exchange between the UE and the E-UTRAN (e.g., eNodeB), the UE may support two configurations: 1) band 17 as primary carrier and band 4 as secondary carrier and 2) band 4 as primary carrier and band 17 as secondary carrier.

In one exemplary embodiment, when the battery falls below a 50% threshold, the UE can autonomously send a UECapabilityInformation message to the eNodeB indicating that it can only support one CA configuration and not both configurations that it would otherwise be able to support.

In other embodiments, when devices are implemented with full LTE-Advanced capabilities of CA, the devices may support five component carriers and network operators may also support CA on five component carriers. For example, the five component carriers would include one primary component carrier and four secondary component carriers.

Under such full CA capabilities, a graduated lowering of capabilities can be implemented. For example, when the battery power level is greater than 50% or when the device is connected to a utility power source, UECapabilityInformation messages to the eNodeB can indicate that all the five CA component carriers are supported by the UE.

However, when the battery power level is less than 50% and greater than 40%, UECapabilityInformation messages to the eNodeB can indicate that only four CA component carriers are supported by the UE. When the battery power level is less than 40% and greater than 30%, UECapabilityInformation messages to the eNodeB can indicate that only three CA component carriers are supported by the UE. When the battery power level is less than 30% and greater than 20%, UECapabilityInformation messages to the eNodeB can indicate that only two CA component carriers are supported by the UE. When the battery power level is less than 20% and greater than 10%, UECapabilityInformation messages to the eNodeB can indicated that only 1 CA component carrier is supported by the UE. When the battery level is less than 10%, UECapabilityInformation messages to the eNodeB can indicate that CA is currently not supported by the UE. This power conservation technique can help optimize and enhance battery life without sacrificing user experience. Use of the UE while on battery power can be extended using these power management and power saving techniques.

Figure 4:
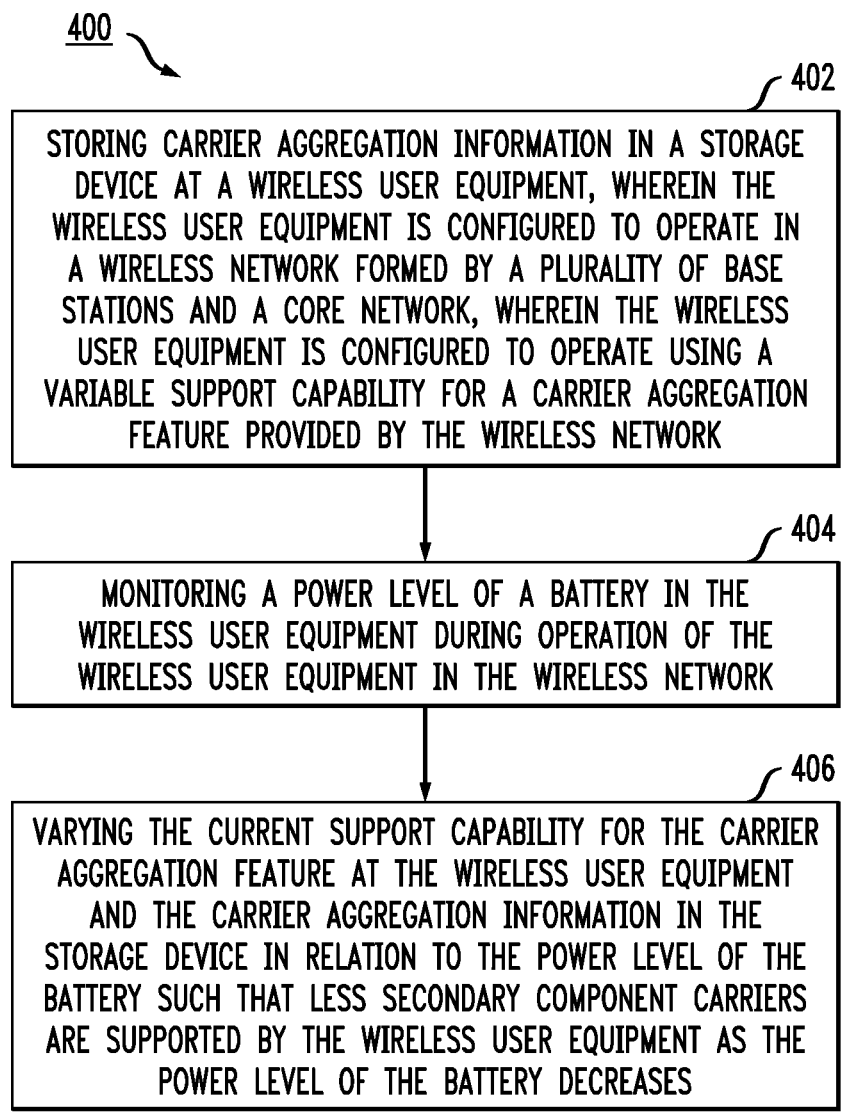
FIG. 4 is a flow chart of an exemplary embodiment of a process facilitating power conservation in a wireless user equipment.

With reference to FIG. 4, an exemplary embodiment of a process 400 facilitating power conservation in a wireless user equipment begins at 402 where carrier aggregation information is stored in a storage device at a wireless user equipment. The wireless user equipment is configured to operate in a wireless network formed by a plurality of base stations and a core network. The wireless user equipment is configured to operate using a variable support capability for a carrier aggregation feature provided by the wireless network. The carrier aggregation feature enables the wireless user equipment to aggregate bandwidth of a primary component carrier and at least one secondary component carrier to improve throughput. The carrier aggregation information in the storage device is indicative of a current support capability of the wireless user equipment in relation to the carrier aggregation feature.

At 404, a power level of a battery in the wireless user equipment is monitored during operation of the wireless user equipment in the wireless network. The plurality of base stations include a serving base station providing wireless service to the wireless user equipment. Next, the current support capability for the carrier aggregation feature at the wireless user equipment and the carrier aggregation information in the storage device are varied in relation to the power level of the battery such that less secondary component carriers are supported by the wireless user equipment as the power level of the battery decreases (406).

In another embodiment of the process 400, the wireless user equipment is configured to support the primary component carrier and one secondary component carrier. In this embodiment, the current support capability is varied between supporting one and zero secondary component carriers based on the power level of the battery in relation to a first predetermined threshold such that one secondary component carrier is normally supported and zero secondary component carriers are supported after the power level is less than the first predetermined threshold.

In yet another embodiment of the process 400, the wireless user equipment is configured to support the primary component carrier and two secondary component carriers. In this embodiment, the current support capability is varied between supporting two, one, and zero secondary component carriers based on the power level of the battery in relation to first and second predetermined thresholds such that two secondary component carriers are normally supported, one secondary component carrier is supported after the power level is less than the first predetermined threshold, and zero secondary component carriers are supported after the power level is less than the second predetermined threshold.

In still another embodiment of the process 400, the wireless user equipment is configured to support the primary component carrier and three secondary component carriers. In this embodiment, the current support capability is varied between supporting three, two, one, and zero secondary component carriers based on the power level of the battery in relation to first, second, and third predetermined thresholds such that three secondary component carriers are normally supported, two secondary component carriers are supported after the power level is less than the first predetermined threshold, one secondary component carrier is supported after the power level is less than the second predetermined threshold, and zero secondary component carriers are supported after the power level is less than the third predetermined threshold.

In still yet another embodiment of the process 400, the wireless user equipment is configured to support the primary component carrier and four secondary component carriers. In this embodiment, the current support capability is varied between supporting four, three, two, one, and zero secondary component carriers based on the power level of the battery in relation to first, second, third, and fourth predetermined thresholds such that four secondary component carriers are normally supported, three secondary component carriers are supported after the power level is less than the first predetermined threshold, two secondary component carriers are supported after the power level is less than the second predetermined threshold, one secondary component carrier is supported after the power level is less than the third predetermined threshold, and zero secondary component carriers are supported after the power level is less than the fourth predetermined threshold.

Figure 5:
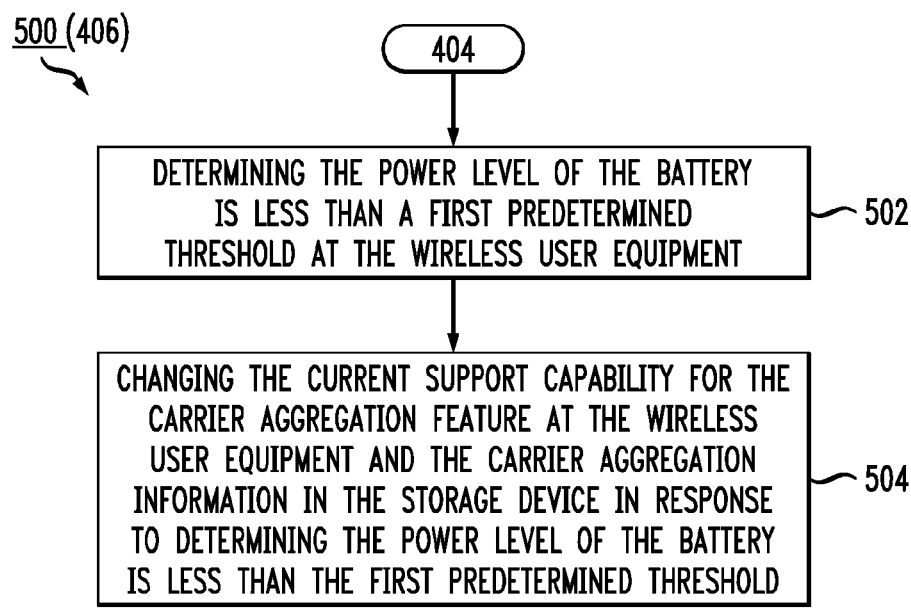
FIG. 5, in conjunction with FIG. 4, is a flow chart of another exemplary embodiment of a process facilitating power conservation in a wireless user equipment.

With reference to FIGS. 4 and 5, an embodiment of a process 500 facilitating power conservation in a wireless user equipment includes the process 400 of FIG. 4 and performs 406 by continuing from 404 to 502. At 502, the process 500 determines the power level of the battery is less than a first predetermined threshold at the wireless user equipment. Next, the current support capability for the carrier aggregation feature at the wireless user equipment and the carrier aggregation information in the storage device are changed in response to determining the power level of the battery is less than the first predetermined threshold (504). The succeeding current support capability indicates the wireless user equipment supports less secondary component carriers than the preceding current support capability.

In another embodiment of the process 500, the user equipment is configured to support the primary component carrier and at least two secondary component carriers. In this embodiment, the process 500 also includes determining the power level of the battery is less than a second predetermined threshold. The second predetermined threshold being less than the first predetermined threshold. Next, the current support capability for the carrier aggregation feature at the wireless user equipment and the carrier aggregation information in the storage device are changed in response to determining the power level of the battery is less than the second predetermined threshold. In this embodiment, the succeeding current support capability indicates the wireless user equipment supports less secondary component carriers than the wireless user equipment would support if the power level of the battery was greater than the second predetermined threshold.

In yet another embodiment of the process 500, the user equipment is configured to support the primary component carrier and at least three secondary component carriers. In this embodiment, the process 500 also includes determining the power level of the battery is less than a third predetermined threshold. The third predetermined threshold being less than the second predetermined threshold. Next, the current support capability for the carrier aggregation feature at the wireless user equipment and the carrier aggregation information in the storage device are changed in response to determining the power level of the battery is less than the third predetermined threshold. In this embodiment, the succeeding current support capability indicates the wireless user equipment supports less secondary component carriers than the wireless user equipment would support if the power level of the battery was greater than the third predetermined threshold.

In still another embodiment of the process 500, the user equipment is configured to support the primary component carrier and at least four secondary component carriers. In this embodiment, the process 500 also includes determining the power level of the battery is less than a fourth predetermined threshold. The fourth predetermined threshold being less than the third predetermined threshold. Next, the current support capability for the carrier aggregation feature at the wireless user equipment and the carrier aggregation information in the storage device are changed in response to determining the power level of the battery is less than the fourth predetermined threshold. In this embodiment, the succeeding current support capability indicates the wireless user equipment supports less secondary component carriers than the wireless user equipment would support if the power level of the battery was greater than the fourth predetermined threshold.

Figure 6:
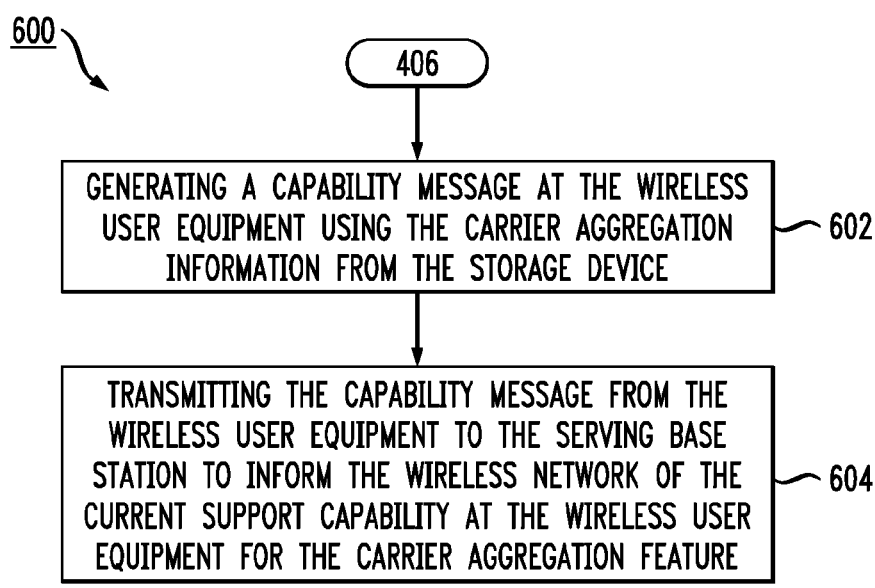
FIG. 6, in conjunction with FIG. 4, is a flow chart of yet another exemplary embodiment of a process facilitating power conservation in a wireless user equipment.

With reference to FIGS. 4 and 6, an embodiment of a process 600 facilitating power conservation in a wireless user equipment includes the process 400 of FIG. 4 and continues from 406 to 602 a capability message is generated at the wireless user equipment using the carrier aggregation information from the storage device. Next, the capability message is transmitted from the wireless user equipment to the serving base station to inform the wireless network of the current support capability at the wireless user equipment for the carrier aggregation feature (604).

In another embodiment of the process 600, the capability message is generated in conjunction with generation of a connection request message. In this embodiment, the capability message is transmitted to the serving base station in conjunction with requesting access to the wireless network after the wireless user equipment is powered up and communication with the wireless network is enabled at the wireless user equipment.

In yet another embodiment, the process 600 also includes receiving a connection setup message from the serving base station at the wireless user equipment. In this embodiment, the capability message is generated in conjunction with generation of a setup complete message after receiving the connection setup message and transmitted to the serving base station along with the setup complete message in response to the connection setup message.

In still another embodiment, the process 600 also includes receiving a capability enquiry message from the serving base station at the wireless user equipment. In this embodiment, the capability message is generated in conjunction with generation of a capability information message after receiving the capability enquiry message and transmitted to the serving base station along with the capability information message in response to the capability enquiry message.

In still yet another embodiment, the process 600 also includes receiving a connection reconfiguration message from the serving base station at the wireless user equipment. In this embodiment, the capability message is generated in conjunction with generation of a reconfiguration complete message after receiving the connection reconfiguration message and transmitted to the serving base station along with the reconfiguration complete message in response to the connection reconfiguration message.

Figure 7:
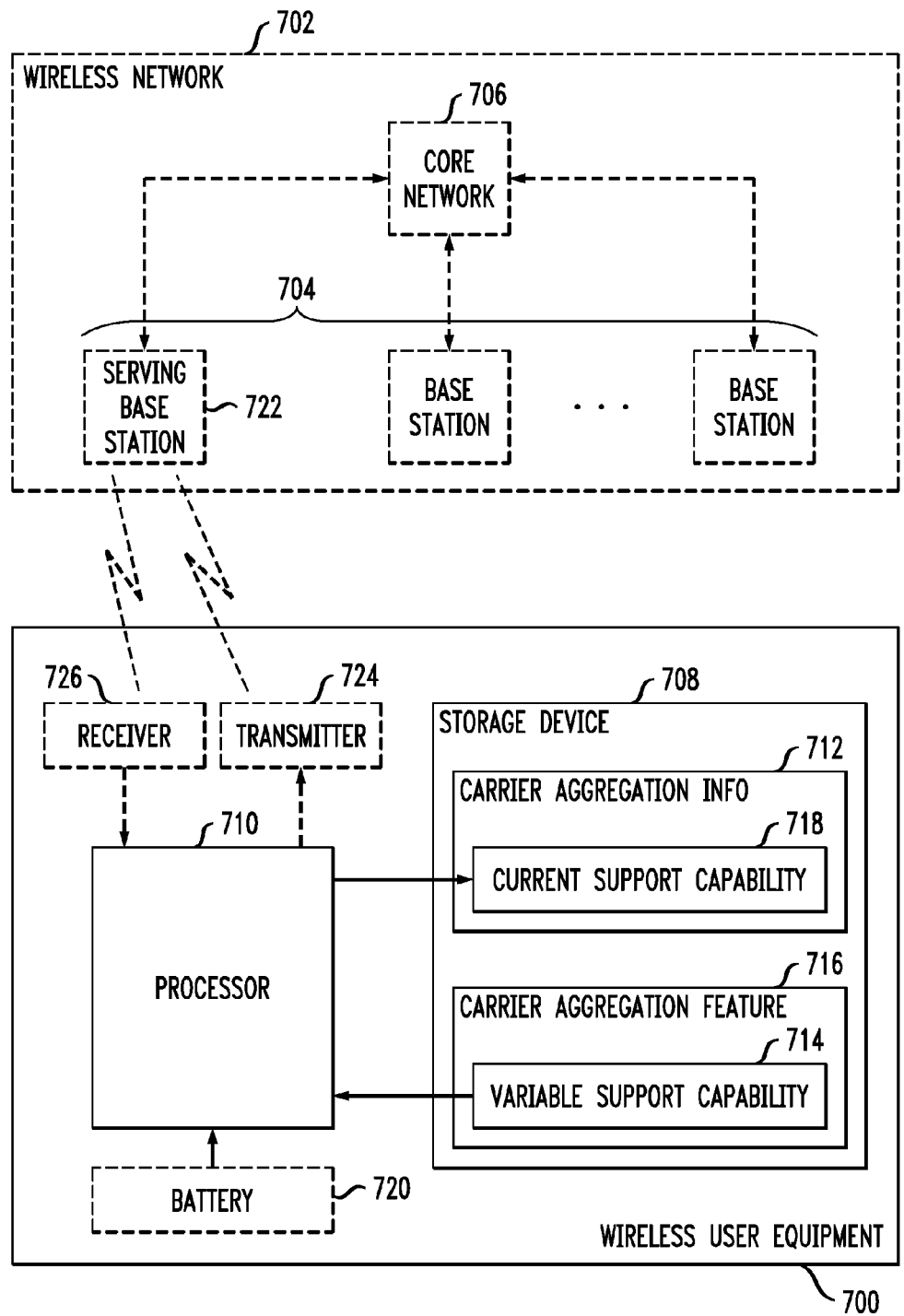
FIG. 7 is a block diagram of an exemplary embodiment of a wireless user equipment configured to operate in a wireless network that provides a carrier aggregation feature.

With reference to FIG. 7, an exemplary embodiment of a wireless user equipment 700 configured to operate in a wireless network 702 formed by a plurality of base stations 704 and a core network 706. The wireless user device 700 includes a storage device 708 and at least one processor 710. The storage device 708 configured to store carrier aggregation information 712. The wireless user equipment 700 is configured to operate using a variable support capability 714 for a carrier aggregation feature 716 provided by the wireless network 706. The carrier aggregation feature 716 enables the wireless user equipment 700 to aggregate bandwidth of a primary component carrier and at least one secondary component carrier to improve throughput. Carrier aggregation information 712 stored in the storage device 708 is indicative of a current support capability 718 in relation to the carrier aggregation feature 716. The at least one processor 710 configured to monitor a power level of a battery 720 in the wireless user equipment 700 during operation of the wireless user equipment 700 in the wireless network 702. The plurality of base stations 704 include a serving base station 722 providing wireless service to the wireless user equipment 700. The at least one processor 710 is configured to vary the current support capability 718 for the carrier aggregation feature 716 and the carrier aggregation information 712 in the storage device 708 in relation to the power level of the battery 720 such that less secondary component carriers are supported as the power level of the battery 720 decreases.

In another embodiment, the wireless user equipment 700 is configured to support the primary component carrier and one secondary component carrier. In this embodiment, the at least one processor 710 is configured to vary the current support capability 718 between supporting one and zero secondary component carriers based on the power level of the battery 720 in relation to a first predetermined threshold such that one secondary component carrier is normally supported and zero secondary component carriers are supported after the power level is less than the first predetermined threshold.

In yet another embodiment, the wireless user equipment 700 is configured to support the primary component carrier and two secondary component carriers. In this embodiment, the at least one processor 710 is configured to vary the current support capability 718 between supporting two, one, and zero secondary component carriers based on the power level of the battery 720 in relation to first and second predetermined thresholds such that two secondary component carriers are normally supported, one secondary component carrier is supported after the power level is less than the first predetermined threshold, and zero secondary component carriers are supported after the power level is less than the second predetermined threshold.

In still another embodiment, the wireless user equipment 700 is configured to support the primary component carrier and three secondary component carriers. In this embodiment, the at least one processor 710 is configured to vary the current support capability 718 between supporting three, two, one, and zero secondary component carriers based on the power level of the battery 720 in relation to first, second, and third predetermined thresholds such that three secondary component carriers are normally supported, two secondary component carriers are supported after the power level is less than the first predetermined threshold, one secondary component carrier is supported after the power level is less than the second predetermined threshold, and zero secondary component carriers are supported after the power level is less than the third predetermined threshold.

In still yet another embodiment, the wireless user equipment 700 is configured to support the primary component carrier and four secondary component carriers. In this embodiment, the at least one processor 710 is configured to vary the current support capability 718 between supporting four, three, two, one, and zero secondary component carriers based on the power level of the battery in relation to first, second, third, and fourth predetermined thresholds such that four secondary component carriers are normally supported, three secondary component carriers are supported after the power level is less than the first predetermined threshold, two secondary component carriers are supported after the power level is less than the second predetermined threshold, one secondary component carrier is supported after the power level is less than the third predetermined threshold, and zero secondary component carriers are supported after the power level is less than the fourth predetermined threshold.

In another embodiment of the wireless user equipment 700, the at least one processor 710 is configured to determine the power level of the battery 720 is less than a first predetermined threshold. In this embodiment, the at least one processor 710 is configured to change the current support capability 718 for the carrier aggregation feature 716 and the carrier aggregation information 712 in the storage device 708 in response to determining the power level of the battery 720 is less than the first predetermined threshold. In the embodiment being described, the succeeding current support capability 718 indicates the wireless user equipment 700 supports less secondary component carriers than the preceding current support capability 718.

In a further embodiment, the user equipment 700 is configured to support the primary component carrier and at least two secondary component carriers. In this embodiment, the at least one processor 710 is configured to determine the power level of the battery 720 is less than a second predetermined threshold. The second predetermined threshold being less than the first predetermined threshold. In the embodiment being described, the at least one processor 710 is configured to change the current support capability 718 for the carrier aggregation feature 716 and the carrier aggregation information 712 in the storage device 708 in response to determining the power level of the battery 720 is less than the second predetermined threshold. In this embodiment, the succeeding current support capability 718 indicates the wireless user equipment 700 supports less secondary component carriers than the wireless user equipment 700 would support if the power level of the battery 720 was greater than the second predetermined threshold.

In an even further embodiment, the user equipment 700 is configured to support the primary component carrier and at least three secondary component carriers. In this embodiment, the at least one processor 710 is configured to determine the power level of the battery 720 is less than a third predetermined threshold. The third predetermined threshold being less than the second predetermined threshold. In the embodiment being described, the at least one processor 710 is configured to change the current support capability 718 for the carrier aggregation feature 716 and the carrier aggregation information 712 in the storage device 708 in response to determining the power level of the battery 720 is less than the third predetermined threshold. In this embodiment, the succeeding current support capability 718 indicates the wireless user equipment 700 supports less secondary component carriers than the wireless user equipment 700 would support if the power level of the battery 720 was greater than the third predetermined threshold.

In an even yet further embodiment, the user equipment 700 is configured to support the primary component carrier and at least four secondary component carriers. In this embodiment, the at least one processor 710 is configured to determine the power level of the battery 720 is less than a fourth predetermined threshold. The fourth predetermined threshold being less than the third predetermined threshold. In the embodiment being described, the at least one processor 710 is configured to change the current support capability 718 for the carrier aggregation feature 716 and the carrier aggregation information 712 in the storage device 708 in response to determining the power level of the battery 720 is less than the fourth predetermined threshold. In this embodiment, the succeeding current support capability 718 indicates the wireless user equipment 700 supports less secondary component carriers than the wireless user equipment 700 would support if the power level of the battery 700 was greater than the fourth predetermined threshold.

In yet another embodiment of the wireless user equipment 700, the at least one processor 710 is configured to generate a capability message using the carrier aggregation information 712 from the storage device. In this embodiment, the wireless user equipment 700 also includes a transmitter 724 configured to transmit the capability message to the serving base station 722 to inform the wireless network 702 of the current support capability 718 for the carrier aggregation feature 716.

In a further embodiment of the wireless user equipment 700, the at least one processor 710 is configured to generate the capability message in conjunction with generation of a connection request message. In this embodiment, the transmitter 724 is configured to transmit the capability message to the serving base station 722 along with the connection request message in conjunction with requesting access to the wireless network 702 after the wireless user equipment 700 is powered up and communication with the wireless network 702 is enabled at the wireless user equipment 700.

In another further embodiment, the wireless user equipment 700 also includes a receiver 726 configured to receive a connection setup message from the serving base station 722. In this embodiment, the at least one processor 710 is configured to generate the capability message in conjunction with generation of a setup complete message after receiving the connection setup message. In the embodiment being described, the transmitter 724 is configured to transmit the capability message to the serving base station 722 along with the setup complete message in response to the connection setup message.

In yet another further embodiment, the wireless user equipment 700 also includes a receiver 726 configured to receive a capability enquiry message from the serving base station 722. In this embodiment, the at least one processor 710 is configured to generate the capability message in conjunction with generation of a capability information message after receiving the capability enquiry message. In the embodiment being described, the transmitter 724 is configured to transmit the capability message to the serving base station 722 along with the capability information message in response to the capability enquiry message.

In yet another further embodiment, the wireless user equipment 700 also includes a receiver 726 configured to receive a connection reconfiguration message from the serving base station 722. In this embodiment, the at least one processor 710 is configured to generate the capability message in conjunction with generation of a reconfiguration complete message after receiving the connection reconfiguration message. In the embodiment being described, the transmitter 724 is configured to transmit the capability message to the serving base station 722 along with the reconfiguration complete message in response to the connection reconfiguration message.

With reference again to FIGS. 4-7, an exemplary embodiment of a non-transitory computer-readable medium storing program instructions that, when executed by at least one processor 710, cause a wireless user equipment 700 to perform a process 400 facilitating power conservation in the wireless user equipment 700. In one exemplary embodiment, the process 400 includes storing carrier aggregation information 712 in a storage device 708 at the wireless user equipment 700 (see FIG. 4, item 402). The wireless user equipment 700 is configured to operate in a wireless network 702 formed by a plurality of base stations 704 and a core network 706. The wireless user equipment 700 is configured to operate using a variable support capability 714 for a carrier aggregation feature 716 provided by the wireless network 702. The carrier aggregation feature 716 enables the wireless user equipment 700 to aggregate bandwidth of a primary component carrier and at least one secondary component carrier to improve throughput. The carrier aggregation information 712 in the storage device 708 is indicative of a current support capability 718 of the wireless user equipment 700 in relation to the carrier aggregation feature 716.

At 404 (see FIG. 4), a power level of a battery 720 in the wireless user equipment 700 is monitored during operation of the wireless user equipment 700 in the wireless network 702. The plurality of base stations 704 include a serving base station 722 providing wireless service to the wireless user equipment 700. Next, the current support capability 718 for the carrier aggregation feature 716 and the carrier aggregation information 712 in the storage device 708 are varied in relation to the power level of the battery 720 such that less secondary component carriers are supported by the wireless user equipment 700 as the power level of the battery 720 decreases (see FIG. 4, item 406).

In various additional embodiments, the instructions stored in the non-transitory computer-readable memory, when executed by the at least one processor 710, may cause the wireless user equipment 700 to perform various combinations of functions associated with the processes 400, 500, 600 facilitating power conservation in the wireless user equipment 700. In other words, the various features described above may be implemented in any suitable combination by the program instructions stored in the non-transitory computer-readable medium. Any suitable components of the wireless user equipment 700 described above may include the at least one processor 710 and non-transitory computer-readable medium associated with the corresponding program instructions. Alternatively, the at least one processor 710 and non-transitory computer-readable medium associated with the corresponding program instructions may be individual or combined components that are in operative communication with any suitable combination of components of the wireless user equipment 700 described above.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method facilitating power conservation in a wireless user equipment, comprising:
   storing carrier aggregation information in a storage device at a wireless user equipment, wherein the wireless user equipment is configured to operate in a wireless network formed by a plurality of base stations and a core network, wherein the wireless user equipment is configured to operate using a variable support capability for a carrier aggregation feature provided by the wireless network, wherein the carrier aggregation feature enables the wireless user equipment to aggregate bandwidth of a primary component carrier and at least one secondary component carrier to improve throughput, wherein the carrier aggregation information in the storage device is indicative of a current support capability of the wireless user equipment in relation to the carrier aggregation feature;
   monitoring a power level of a battery in the wireless user equipment during operation of the wireless user equipment in the wireless network, wherein the plurality of base stations include a serving base station providing wireless service to the wireless user equipment; and
   varying the current support capability for the carrier aggregation feature at the wireless user equipment and the carrier aggregation information in the storage device in relation to the power level of the battery such that less secondary component carriers are supported by the wireless user equipment as the power level of the battery decreases.

2. The method of claim 1 wherein the wireless user equipment is configured to support the primary component carrier and one secondary component carrier;
   wherein the current support capability is varied between supporting one and zero secondary component carriers based on the power level of the battery in relation to a first predetermined threshold such that one secondary component carrier is normally supported and zero secondary component carriers are supported after the power level is less than the first predetermined threshold.

3. The method of claim 1 wherein the wireless user equipment is configured to support the primary component carrier and four secondary component carriers;
   wherein the current support capability is varied between supporting four, three, two, one, and zero secondary component carriers based on the power level of the battery in relation to first, second, third, and fourth predetermined thresholds such that four secondary component carriers are normally supported, three secondary component carriers are supported after the power level is less than the first predetermined threshold, two secondary component carriers are supported after the power level is less than the second predetermined threshold, one secondary component carrier is supported after the power level is less than the third predetermined threshold, and zero secondary component carriers are supported after the power level is less than the fourth predetermined threshold.

4. The method of claim 1, further comprising:
   determining the power level of the battery is less than a first predetermined threshold at the wireless user equipment; and
   changing the current support capability for the carrier aggregation feature at the wireless user equipment and the carrier aggregation information in the storage device in response to determining the power level of the battery is less than the first predetermined threshold, wherein the succeeding current support capability indicates the wireless user equipment supports less secondary component carriers than the preceding current support capability.

5. The method of claim 4 wherein the user equipment is configured to support the primary component carrier and at least two secondary component carriers, further comprising:
   determining the power level of the battery is less than a second predetermined threshold, the second predetermined threshold being less than the first predetermined threshold; and
   changing the current support capability for the carrier aggregation feature at the wireless user equipment and the carrier aggregation information in the storage device in response to determining the power level of the battery is less than the second predetermined threshold, wherein the succeeding current support capability indicates the wireless user equipment supports less secondary component carriers than the wireless user equipment would support if the power level of the battery was greater than the second predetermined threshold.

6. The method of claim 5 wherein the user equipment is configured to support the primary component carrier and at least three secondary component carriers, further comprising:
  determining the power level of the battery is less than a third predetermined threshold, the third predetermined threshold being less than the second predetermined threshold; and
  changing the current support capability for the carrier aggregation feature at the wireless user equipment and the carrier aggregation information in the storage device in response to determining the power level of the battery is less than the third predetermined threshold, wherein the succeeding current support capability indicates the wireless user equipment supports less secondary component carriers than the wireless user equipment would support if the power level of the battery was greater than the third predetermined threshold.

7. The method of claim 6 wherein the user equipment is configured to support the primary component carrier and at least four secondary component carriers, further comprising:
  determining the power level of the battery is less than a fourth predetermined threshold, the fourth predetermined threshold being less than the third predetermined threshold; and
  changing the current support capability for the carrier aggregation feature at the wireless user equipment and the carrier aggregation information in the storage device in response to determining the power level of the battery is less than the fourth predetermined threshold, wherein the succeeding current support capability indicates the wireless user equipment supports less secondary component carriers than the wireless user equipment would support if the power level of the battery was greater than the fourth predetermined threshold.

8. The method of claim 1, further comprising:
  generating a capability message at the wireless user equipment using the carrier aggregation information from the storage device; and
  transmitting the capability message from the wireless user equipment to the serving base station to inform the wireless network of the current support capability at the wireless user equipment for the carrier aggregation feature.

9. The method of claim 8 wherein the capability message is generated in conjunction with generation of a connection request message and transmitted to the serving base station in conjunction with requesting access to the wireless network after the wireless user equipment is powered up and communication with the wireless network is enabled at the wireless user equipment.

10. The method of claim 8, further comprising:
  receiving a connection setup message from the serving base station at the wireless user equipment;
  wherein the capability message is generated in conjunction with generation of a setup complete message after receiving the connection setup message and transmitted to the serving base station along with the setup complete message in response to the connection setup message.

11. The method of claim 8, further comprising:
  receiving a capability enquiry message from the serving base station at the wireless user equipment;
  wherein the capability message is generated in conjunction with generation of a capability information message after receiving the capability enquiry message and transmitted to the serving base station along with the capability information message in response to the capability enquiry message.

12. The method of claim 8, further comprising:
  receiving a connection reconfiguration message from the serving base station at the wireless user equipment;
  wherein the capability message is generated in conjunction with generation of a reconfiguration complete message after receiving the connection reconfiguration message and transmitted to the serving base station along with the reconfiguration complete message in response to the connection reconfiguration message.

13. A wireless user equipment configured to operate in a wireless network formed by a plurality of base stations and a core network, the wireless user equipment comprising:
  a storage device configured to store carrier aggregation information, wherein the wireless user equipment is configured to operate using a variable support capability for a carrier aggregation feature provided by the wireless network, wherein the carrier aggregation feature enables the wireless user equipment to aggregate bandwidth of a primary component carrier and at least one secondary component carrier to improve throughput, wherein carrier aggregation information stored in the storage device is indicative of a current support capability in relation to the carrier aggregation feature; and
  at least one processor configured to monitor a power level of a battery in the wireless user equipment during operation of the wireless user equipment in the wireless network, wherein the plurality of base stations include a serving base station providing wireless service to the wireless user equipment;
  wherein the at least one processor is configured to vary the current support capability for the carrier aggregation feature and the carrier aggregation information in the storage device in relation to the power level of the battery such that less secondary component carriers are supported as the power level of the battery decreases.

14. The wireless user equipment of claim 13 wherein the at least one processor is configured to determine the power level of the battery is less than a first predetermined threshold;
  wherein the at least one processor is configured to change the current support capability for the carrier aggregation feature and the carrier aggregation information in the storage device in response to determining the power level of the battery is less than the first predetermined threshold, wherein the succeeding current support capability indicates the wireless user equipment supports less secondary component carriers than the preceding current support capability.

15. The wireless user equipment of claim 13 wherein the at least one processor is configured to generate a capability message using the carrier aggregation information from the storage device, the wireless user equipment further comprising:
  a transmitter configured to transmit the capability message to the serving base station to inform the wireless network of the current support capability for the carrier aggregation feature.

16. The wireless user equipment of claim 15 wherein the at least one processor is configured to generate the capability message in conjunction with generation of a connection request message;
  wherein the transmitter is configured to transmit the capability message to the serving base station along with the connection request message in conjunction with requesting access to the wireless network after the wireless user equipment is powered up and communication with the wireless network is enabled at the wireless user equipment.

17. The wireless user equipment of claim 15, further comprising:
- a receiver configured to receive a connection setup message from the serving base station;
- wherein the at least one processor is configured to generate the capability message in conjunction with generation of a setup complete message after receiving the connection setup message;
- wherein the transmitter is configured to transmit the capability message to the serving base station along with the setup complete message in response to the connection setup message.

18. The wireless user equipment of claim 15, further comprising:
- a receiver configured to receive a capability enquiry message from the serving base station;
- wherein the at least one processor is configured to generate the capability message in conjunction with generation of a capability information message after receiving the capability enquiry message;
- wherein the transmitter is configured to transmit the capability message to the serving base station along with the capability information message in response to the capability enquiry message.

19. The wireless user equipment of claim 15, further comprising:
- a receiver configured to receive a connection reconfiguration message from the serving base station;
- wherein the at least one processor is configured to generate the capability message in conjunction with generation of a reconfiguration complete message after receiving the connection reconfiguration message;
- wherein the transmitter is configured to transmit the capability message to the serving base station along with the reconfiguration complete message in response to the connection reconfiguration message.

20. A non-transitory computer-readable medium storing program instructions that, when executed by a processor, cause a wireless user equipment to perform a method facilitating power conservation, the method comprising:
- storing carrier aggregation information in a storage device at a wireless user equipment, wherein the wireless user equipment is configured to operate in a wireless network formed by a plurality of base stations and a core network, wherein the wireless user equipment is configured to operate using a variable support capability for a carrier aggregation feature provided by the wireless network, wherein the carrier aggregation feature enables the wireless user equipment to aggregate bandwidth of a primary component carrier and at least one secondary component carrier to improve throughput, wherein the carrier aggregation information in the storage device is indicative of a current support capability of the wireless user equipment in relation to the carrier aggregation feature;
- monitoring a power level of a battery in the wireless user equipment during operation of the wireless user equipment in the wireless network, wherein the plurality of base stations include a serving base station providing wireless service to the wireless user equipment; and
- varying the current support capability for the carrier aggregation feature at the wireless user equipment and the carrier aggregation information in the storage device in relation to the power level of the battery such that less secondary component carriers are supported by the wireless user equipment as the power level of the battery decreases.

* * * * *